H. A. HOLTAN.
GRAIN CLEANER.
APPLICATION FILED NOV. 26, 1919.
1,354,750.
Patented Oct. 5, 1920.
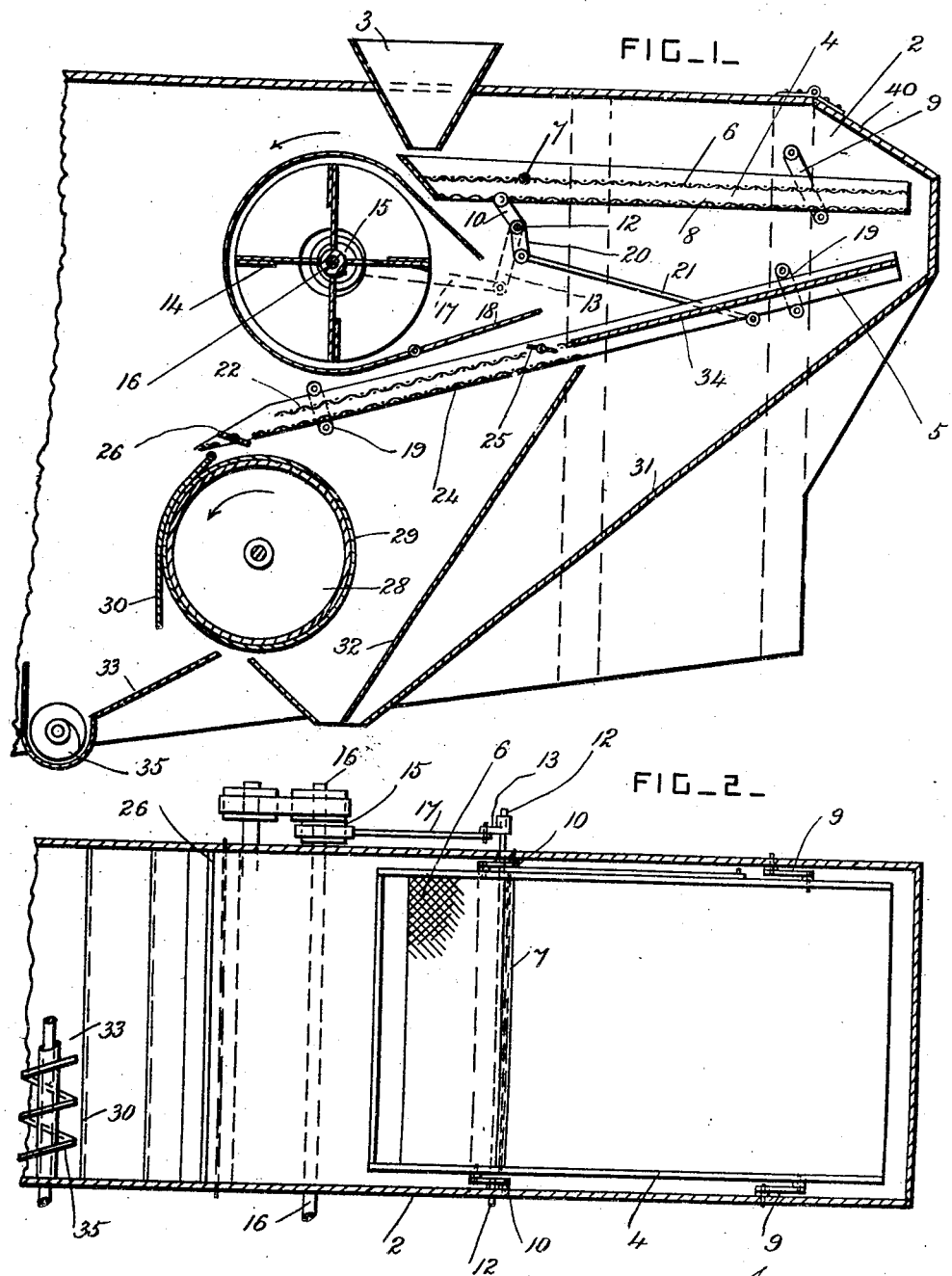
Inventor
Horace A. Holtan
by Herbert W. Jenner.
Attorney.

UNITED STATES PATENT OFFICE.

HORACE A. HOLTAN, OF FALKIRK, NORTH DAKOTA.

GRAIN-CLEANER.

1,354,750.                    Specification of Letters Patent.         Patented Oct. 5, 1920.

Application filed November 26, 1919. Serial No. 340,749.

*To all whom it may concern:*

Be it known that I, HORACE A. HOLTAN, a citizen of the United States, residing at Falkirk, in the county of McLean and State of North Dakota, have invented certain new and useful Improvements in Grain-Cleaners, of which the following is a specification.

This invention relates to cleaners for grain used in connection with threshing machines; and it consists of an auxiliary cleaning apparatus adapted to be secured to the rear end of the threshing machine behind the ordinary cleaning mechanism, constructed as hereinafter fully described and claimed and adapted to remove wild oats, flax seed, and other undesirable small seeds from the wheat.

In the drawings, Figure 1 is a longitudinal section through a grain cleaner constructed according to this invention. Fig. 2 is a plan view of the same.

A casing 2 is provided and is adapted to be secured at the rear end of a threshing machine or grain separator of any approved construction. This casing has a hopper 3 at its top, and the grain as it comes from the cleaning mechanism of the threshing machine is discharged into the hopper 3 by a grain elevator of any approved construction.

Two shaking frames 4 and 5 are arranged inside the casing one above the other. The upper frame 4 has a screen 6 for wheat having a hinge 7 at its front end, and a removable screen 8 for macaroni wheat under the screen 6. The hinge 7 enables the screen 6 to be raised so that the screen 8 can be cleaned without removing the screen 6 from the frame.

The rear end of the frame 4 is supported in the casing by pivoted links 9, and its front end is supported pivotally by arms 10 secured on a rock-shaft 12 journaled in the casing and extending crosswise of it. A fan 14 is journaled in the casing in front of and between the two frames 4 and 5 which are inclined in opposite directions.

An eccentric 15 is secured on the fan shaft 16, and is connected with an arm 13 secured on the rock-shaft 12, by means of an eccentric-rod 17. A wind-board 18 is pivoted to the lower part of the fan casing, and is adjusted to distribute the blast of the fan to the screens according to the nature of the seeds to be removed from the wheat. An escape for blast and light rubbish from the upper rear part of the casing may be provided by raising the hinged flap 40.

The lower frame 5 is pivotally supported in the casing by links 19 at its end portions, and it is reciprocated by an arm 20 secured to the rock-shaft 12, and a connecting-rod 21. The lower frame 5 has two screens 22 and 24 arranged in it one above the other, and adapted to remove flax-seed, and other seeds. All the screens used are of various degrees of fineness, and any approved form of screens or riddles can be used besides those shown in the drawings. The upper screen 22 has a pivoted cut-out 25 at its rear and upper end, and the lower screen 24 has a similar pivoted cut-out 26 at its lower and front end portion. These cut-outs are shown open in Fig. 1, so that the grain can fall through them.

A drum 28 is journaled in the casing below the cut-out 26 of the lower screen, and is covered with canton flannel 29 or other similar rough textile material. An apron 30 of oil-cloth, or other similar material is suspended in the casing so that its smooth side bears against the canton flannel covering of the drum at the front side thereof. The fan and the drum are revolved in the direction of the curved arrows adjacent to them by any suitable driving mechanism.

Three hoppers 31, 32, and 33, are provided. The hopper 31 is arranged in the rear part of the casing and receives the grain which passes over the screens 6 and 8 of the upper frame. The rear end of the casing 2 is closed, up to the level of the screen 6, so that the material which slides off the screen 6 may fall by gravity into the hopper 31. The hopper 32 is arranged between the hopper 31 and the drum 28, and receives the seeds which pass through the screens 22 and 24. The lower frame 5 has an imperforate surface 34 in line with the screen 22 which conducts the seeds which pass through the screen 8 to the screen 22. The hopper 33 is arranged in front of the drum 28, and it has a grain conveyer 35 of approved construction at its lower part. The clean wheat falls into this hopper 33, and is removed by the conveyer 35 and is discharged into a cart or other receptacle by an elevator of any approved construction.

When the cut-out 26 is closed the grain can be discharged into the hopper 33 without being brought into contact with the drum 28. When the cut-out 26 is open the grain falls through it onto the drum, and the oil-cloth apron presses it against the canton flannel covering of the drum which catches the wild oats so that they are removed from the wheat.

The use of an auxiliary grain cleaner constructed in this manner, augments the cleaning action of the grain separator, and is of great use in handling many crops which cannot be satisfactorily cleaned by grain separators as ordinarily constructed.

What I claim is:

In a grain cleaner, a casing provided at its lower part with three hoppers arranged one behind another, two shaking frames supported one above another in the casing, a screen secured in the upper frame and discharging the material that passes over it into the rear hopper, means for blowing air upwardly through the said screen, an inclined gatherboard secured in the rear part of the lower frame under the said screen and over the rear hopper, a screen secured in the front part of the lower frame and receiving the material which slides down the gatherboard and provided with a cut-out at its lower end portion, which cut-out when closed delivers the material that slides over it into the front hopper, and means for removing oats and similar seeds arranged below the said cut-out and receiving the material which passes through it when open and permitting the clean grain to fall into the front hopper.

In testimony whereof I have affixed my signature.

HORACE A. HOLTAN.